US011961632B2

(12) United States Patent
Lee et al.

(10) Patent No.: US 11,961,632 B2
(45) Date of Patent: Apr. 16, 2024

(54) FABRICATION METHOD OF CONDUCTIVE NANONETWORKS USING MASTERMOLD

(71) Applicant: KOREA ADVANCED INSTITUTE OF SCIENCE AND TECHNOLOGY, Daejeon (KR)

(72) Inventors: Jung-Yong Lee, Daejeon (KR); Kyungmin Kim, Daejeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 20 days.

(21) Appl. No.: 17/539,606

(22) Filed: Dec. 1, 2021

(65) Prior Publication Data

US 2022/0181048 A1 Jun. 9, 2022

(30) Foreign Application Priority Data

Dec. 4, 2020 (KR) ........................ 10-2020-0168464
Nov. 5, 2021 (KR) ........................ 10-2021-0151155

(51) Int. Cl.
*H01B 13/00* (2006.01)
*D01D 5/00* (2006.01)
*H01B 1/12* (2006.01)

(52) U.S. Cl.
CPC ......... *H01B 13/0033* (2013.01); *D01D 5/003* (2013.01); *H01B 1/124* (2013.01)

(58) Field of Classification Search
CPC ...... H01B 1/124; H01B 13/0033; H01B 1/02; D01D 5/003
See application file for complete search history.

(56) References Cited

U.S. PATENT DOCUMENTS 10,831,233 B2 11/2020 Dodds et al.
2012/0325545 A1* 12/2012 Higashitani .......... H05K 3/1216 174/268
2022/0181047 A1* 6/2022 Lee .................... H01B 13/0026

FOREIGN PATENT DOCUMENTS

GB 2594941 * 5/2020 ......... H01L 31/0224
KR 10-2006-0018466 A 3/2006

(Continued)

OTHER PUBLICATIONS

English Translation of Korean Office Action from Korean Application No. 10-2021-0151155, dated Sep. 5, 2023, 4 pages.

*Primary Examiner* — Monica A Huson
(74) *Attorney, Agent, or Firm* — Calderone McKay LLC

(57) ABSTRACT

There is provided a fabrication method of conductive nanonetworks using a mastermold by which, in forming the conductive nanonetworks, electrical properties and optical properties of the conductive nanonetworks are improved by excluding contact resistance between nanowires and minimizing surface roughness of the conductive nanonetworks, and a nanoelectrode having a large area can be easily formed by applying a method of replicating the conductive nanonetworks on the mastermold to a substrate. The fabrication method of conductive nanonetworks using a mastermold includes: preparing a mastermold that has a conductive nanonetwork replicating region patterned in relief; coating the mastermold with a conductive material; and forming conductive nanonetworks on an application target substrate by replicating a conductive material, with which the conductive nanonetwork replicating region is coated, onto the application target substrate.

6 Claims, 20 Drawing Sheets

(56) References Cited

FOREIGN PATENT DOCUMENTS

| | | | |
|---|---|---|---|
| KR | 101011447 | B1 | 7/2010 |
| KR | 10-2011-0138447 | A | 12/2011 |
| KR | 10-2015-0116063 | A | 10/2015 |
| KR | 10-2017-0123504 | A | 11/2017 |

* cited by examiner

FABRICATION METHOD OF CONDUCTIVE NANONETWORKS USING MASTERMOLD

CROSS-REFERENCE TO RELATED APPLICATION

This application claims priorities to Korean patent application No. 10-2020-0168464, filed on Dec. 4, 2020 and Korean patent application No 10-2021-0151155, filed on Nov. 5, 2021. The contents of the applications are incorporated herein by reference in their entirety.

BACKGROUND

1. Field

The present disclosure relates to a fabrication method of conductive nanonetworks using a mastermold, and more specifically, to a fabrication method of conductive nanonetworks using a mastermold by which electrical properties and optical properties of the conductive nanonetworks are improved by excluding contact resistance between nanowires and minimizing surface roughness of the conductive nanonetworks and a nanoelectrode having a large area can be easily formed by applying a method of replicating the conductive nanonetworks on the mastermold to a substrate, in forming the conductive nanonetworks.

[National R&D Program Which Supports This Invention]
[Project Identification Number] 1711119623
[Project Number] 2020M3H4A1A02084906
[Ministry Name] Ministry of Science and ICT
[Project Management (Specialized) Agency Name] National Research Foundation of Korea
[Research Program Name] Source Technology Development of Future Nano-Material (R&D)
[Research Project Title] Development of technology for optimizing high-efficient material and element for 100%-or-more-stretchable material-specific stretchable organic solar cell
[Contribution Rate] 34/100
[Project Implementation Institute Name] Korea Advanced Institute of Science and Technology
[Research Period] Jul. 1, 2020 to Dec. 31, 2020
[National R&D Program Which Supports This Invention]
[Project Identification Number] 1711120360
[Project Number] 2020M3D1A2102869
[Ministry Name] Ministry of Science and ICT
[Project Management (Specialized) Agency Name] National Research Foundation of Korea
[Research Program Name] Future Material Discovery Support (R&D)
[Research Project Title] Development of new high-performance material and element for electrochromic transparent display for vehicle
[Contribution Rate] 33/100
[Project Implementation Institute Name] University of Seoul
[Research Period] Jul. 23, 2020 to Jan. 22, 2021
[National R&D Program Which Supports This Invention]
[Project Identification Number] 1711135134
[Project Number] 2020R1A4A1018516
[Ministry Name] Ministry of Science and ICT
[Project Management (Specialized) Agency Name] National Research Foundation of Korea
[Research Program Name] Group Research Support (R&D)
[Research Project Title] Development of stretchable solar cell with consistent performance
[Contribution Rate] 33/100
[Project Implementation Institute Name] Korea Advanced Institute of Science and Technology
[Research Period] Jun. 1, 2021 to Feb. 28, 2022

2. Description of the Related Art

Indium tin oxide (ITO) having properties of optical transmittance of about 85% and sheet resistance of 15 Ω/sq is widely used for nanoelectrodes of various display modules. However, limited reserves and mines of an indium component in ITO result in unstable supply and demand and a relatively high price thereof. In addition, an ITO deposition process has to be performed by expensive and large-sized vacuum equipment with high maintenance costs, and the oxide has a property of brittleness and thus is not suitable to be applied to a flexible electrode.

Recently, research on a conductive nanofilm using flexible metal nanowires which can be produced through a low temperature process has been actively carried out. For example, Korean Patent Registration No. 1011447 discloses a technology of manufacturing a metal polymer film by drying a metal polymer solution, in which metal nanowires are dispersed, on a mold, and stretching the metal polymer film in one direction. In addition, U.S. patent Ser. No. 10/831,233 discloses a technology of patterning a conductive layer, the method including coating a substrate (matrix) with a conductive layer containing nanowires, over-coating a pattern with a peelable polymer layer in a state where a resister pattern is formed over the conductive layer, and then removing the conductive layer formed in a region in which the resist pattern is not formed, by removing the peelable polymer layer.

However, in the related art described above, the conductive nanofilm is formed with metal nanowires being overlapped on one another, and thus the technologies in the related art have drawbacks of unavoidable contact resistance between metal nanowires and high surface roughness. In addition, a post-processing treatment such as a thermal annealing or a laser treatment is required in order to reduce the contact resistance between metal nanowires, and the treatment is a process unsuitable for a flexible polymer substrate. Besides, a solution process according to the related art is difficult to apply to a very hydrophobic substrate.

SUMMARY

The present disclosure is made to solve problems described above, and an object thereof is to provide a fabrication method of conductive nanonetworks using a mastermold by which electrical properties and optical properties of the conductive nanonetworks can be improved by excluding contact resistance between nanowires and minimizing surface roughness of the conductive nanonetworks in forming the conductive nanonetworks.

In addition, another object of the present disclosure is to provide a technology of enabling a nanoelectrode having a large area to be easily formed and waste of a conductive material to be reduced by applying a method of replicating conductive nanonetworks on a mastermold to a substrate.

A fabrication method of conductive nanonetworks using a mastermold according to the present disclosure to achieve the objects includes: preparing a mastermold that has a conductive nanonetwork replicating region patterned in relief; coating the mastermold with a conductive material; and forming conductive nanonetworks on an application target substrate by replicating a conductive material, with which the conductive nanonetwork replicating region is coated, onto the application target substrate.

The mastermold that has the conductive nanonetwork replicating region patterned in relief may be fabricated through a process of applying nanowire networks on a mastermold forming substrate, a process of patterning a region having the nanowire networks in relief by anisotropically etching the mastermold forming substrate on which the nanowire networks are applied, and a process of removing the nanowire networks. The region patterned in relief may correspond to the conductive nanonetwork replicating region patterned in relief of the mastermold.

The fabrication method of conductive nanonetworks using a mastermold may further include, before the coating of the mastermold with the conductive material: forming a hydrophilic thin film layer on the mastermold; and forming a hydrophobic surface treatment layer on the hydrophilic thin film layer, in sequence. The hydrophilic thin film layer may contain a hydrophilic group so as to be bonded to the hydrophobic surface treatment layer, and the hydrophobic surface treatment layer may contain a hydrophobic group so as to be inhibited from being bonded to a conductive material.

The nanowire networks may be formed through electrospinning.

A geometric shape of the nanowire networks may correspond to a geometric shape of the conductive nanonetworks formed on the application target substrate, and electrical properties and optical properties of the conductive nanonetworks may be controllable by changing the geometric shape of the conductive nanonetworks through adjustment of a geometric shape of nanowire networks which are applied.

The geometric shape of the nanowire networks which are to be formed on a substrate may be adjustable by adjusting at least one of a diameter of a needle of an electrospinning device, a voltage applied to the needle, and a concentration of a solution containing a material which is used to form the nanowire networks.

The conductive material may be any one of conductive metal, a carbon-based conductive material, conductive polymer, and conductive nanoparticles, or a combination thereof.

BRIEF DESCRIPTION OF THE DRAWINGS

The above and other aspects, features and advantages of the disclosed example embodiments will be more apparent from the following detailed description taken in conjunction with the accompanying drawings in which.

DETAILED DESCRIPTION

Figure 1:
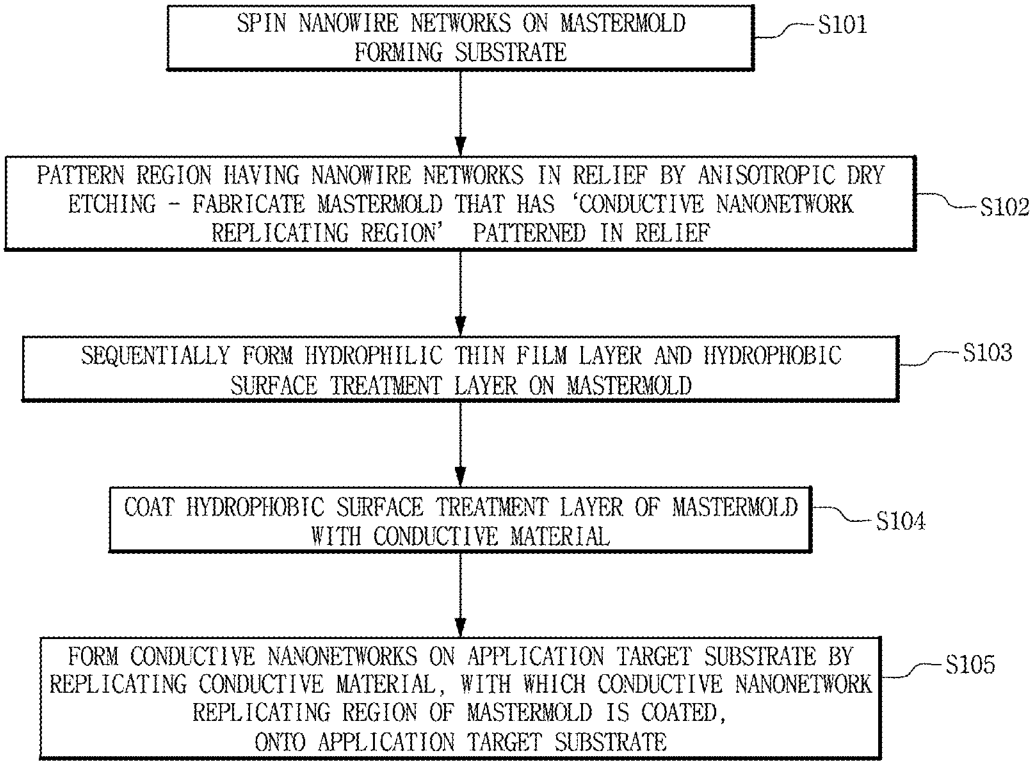
FIG. 1 is a flowchart for illustrating a fabrication method of conductive nanonetworks using a mastermold according to an embodiment of the invention.

Example embodiments are described more fully hereinafter. The example embodiments may, however, be embodied in many different forms and should not be construed as limited to the example embodiments set forth herein. In the description, details of features and techniques may be omitted to more clearly disclose example embodiments.

The terminology used herein is for the purpose of describing particular embodiments only and is not intended to be limiting. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the example embodiments and does not pose a limitation on the scope of the present disclosure unless otherwise claimed. No language in the specification should be construed as indicating any non-claimed element as essential to the practice of the present disclosure as used herein.

The term "comprises" or "includes" as used herein throughout this specification, specifies presence of stated elements, but does not preclude presence or addition of one or more other elements unless the context clearly indicates otherwise.

The present disclosure provides a technology of fabricating conductive nanonetworks through a new process.

As described above in 'Description of the Related Art', a conductive nanofilm made of metal nanowires is provided to substitute for an ITO nanoelectrode of the related art, and the conductive metal-nanowire nanofilm is fabricated typically through using a nanowire solution. The solution process using a nanowire solution is a process of forming a conductive nanofilm having a configuration in which metal nanowires are connected to one another, by applying a solution containing dispersed metal nanowires on a substrate and removing a solvent. The conductive nanofilm made of metal nanowires can be fabricated through the process; however, the metal nanowires which are randomly dispersed in a solution are connected to one another in an overlapping manner. Hence, a finally fabricated conductive metal-nanowire nanofilm unavoidably has high surface roughness and contact resistance between nanowires, and it is not possible to adjust a height of the conductive metal-nanowire nanofilm.

According to example embodiments of the present disclosure, the conductive nanonetworks are fabricated using a mastermold, and thus a problem of contact resistance between nanowires is excluded, and the surface roughness of the finally fabricated conductive nanonetworks is minimized.

In addition, according to example embodiments of the present disclosure, the conductive nanonetworks on a mastermold are replicated to a substrate; thus, the invention is suitable for a process of forming a nanoelectrode having a large area, and unnecessary waste of a conductive material can be reduced.

Besides, example embodiments of the present disclosure provides a technology of selectively adjusting electrical properties and optical properties of conductive nanonetworks by adjusting a thickness of the conductive nanonetworks and controlling a material of nanowire networks used for patterning of the mastermold.

On the other hand, the 'conductive nanonetwork' in example embodiments of the present disclosure means that a conductive material forms a nanosized network. The 'conductive nanonetwork' in example embodiments of the present disclosure corresponds to the conductive nanofilm which is similar to 'forming a mesh shape by metal nanowires' in the related art; however, the term 'conductive nanonetwork' is used in example embodiments of the present disclosure, because there is a difference in configuration between example embodiments of the present disclosure and the related art using the metal nanowires. In the related art, connection between metal nanowires is induced; on the other hand, in example embodiments of the present disclosure, direct forming of the 'nanosized network by the conductive material' is performed without using metal nanowires, and thus the 'conductive nanonetwork' in example embodiments of the present disclosure can be described to have a technical configuration different from that of 'forming the mesh shape by metal nanowires' in the related art.

Figuratively and briefly describing, in the fabrication method of conductive nanonetworks according to example embodiments of the present disclosure, in a state where a shape corresponding to the conductive nanonetworks is patterned in relief on a mastermold, and the relief of the mastermold is coated with a conductive material, the conductive nanonetworks are formed on an application target substrate by replicating the coating material on the relief to the application target substrate.

Hereinafter, the fabrication method of conductive nanonetworks using a mastermold according to an embodiment of the present disclosure will be described in detail with reference to the drawings.

With reference to FIG. 1, the fabrication method of conductive nanonetworks using a mastermold according to an embodiment of the present disclosure is largely divided into processes S101 and S102 of fabricating a mastermold, processes S103 and S104 of coating the mastermold with a conductive material, and a process S105 of replicating conductive nanonetworks 150*a* onto an application target substrate.

First, the processes of fabricating the mastermold proceed as follows.

Figure 2:
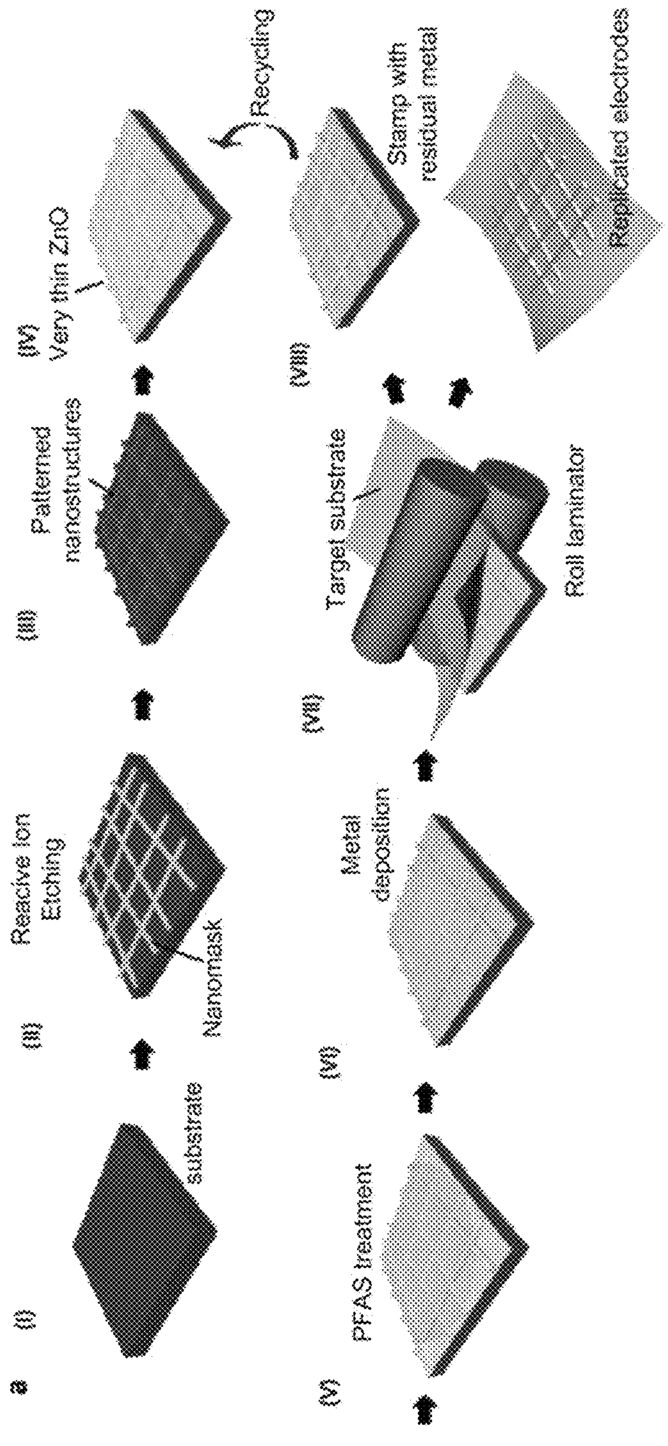
FIG. 2 is a schematic view of a process for illustrating the fabrication method of conductive nanonetworks using a mastermold according to the embodiment of the invention.
Figure 3A:
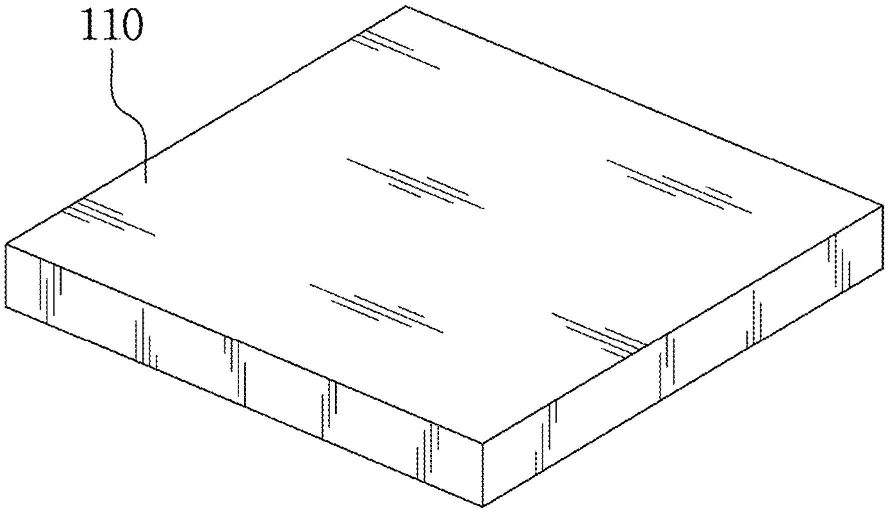
FIGS. 3A to 3H are reference views of the process for illustrating the fabrication method of conductive nanonetworks using a mastermold according to the embodiment of the invention.
Figure 3B:
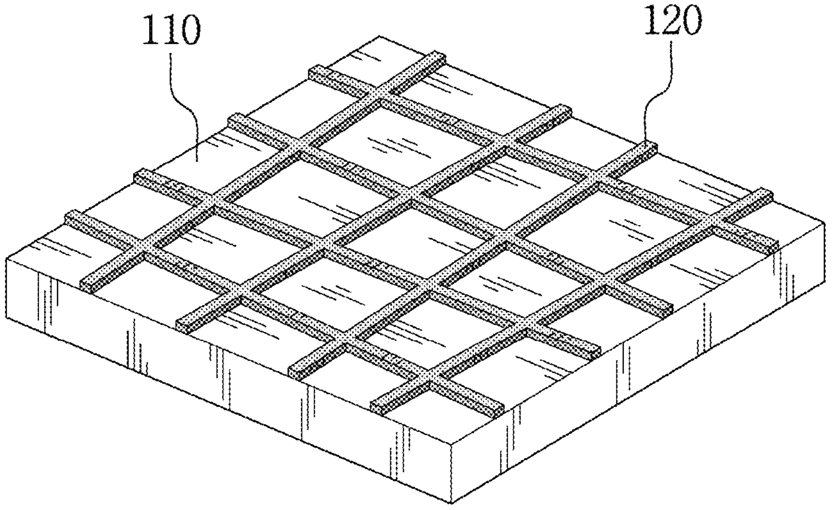

A mastermold forming substrate 110 is prepared, and nanowire networks 120 are formed on the mastermold forming substrate 110 (S101) (refer to (I) and (II) of FIG. 2 and FIGS. 3A and 3B). Various substrates can be applied to the mastermold forming substrate 110, and a silicon substrate 110 can be used, for example.

The nanowire networks 120 can be formed through an electrospinning process, for example, and the process of forming the networks is not limited thereto. In a case of using the electrospinning process, the nanowire networks 120 can be formed through electrospinning of a solution onto the mastermold forming substrate 110, the solution containing a material which forms the nanowire networks 120. Various polymer materials can be used as the material that forms the nanowire networks 120, and examples of the materials can include poly(methyl methacrylate) (PMMA), poly(N-vinylpyrrolidone) (PVP), and the like. For reference, actual nanowire networks 120 form a chaotically structured nanowire shape; however, FIGS. 3A to 3H illustrate the nanowire networks 120 in a grid shape for convenience of description.

In a state where the nanowire networks 120 are formed on the mastermold forming substrate 110, anisotropic dry etching is performed on a front surface of the mastermold forming substrate 110 (refer to (II) of FIG. 2 and FIG. 3B). The substrate 110 in a region with the nanowire networks 120 is not etched by the anisotropic dry etching, and the substrate 110 in a region without the nanowire networks 120 is etched by a certain thickness. Hence, the substrate 110 in the region with the nanowire networks 120 is patterned in relief, and the nanowire networks 120 are removed when patterning of the region with the nanowire networks 120 in relief is completed.

Figure 3C:
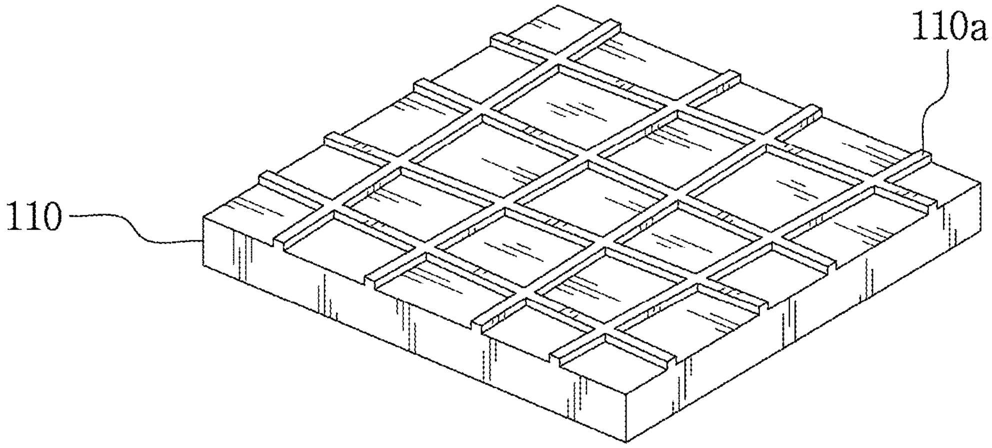
Figure 3D:
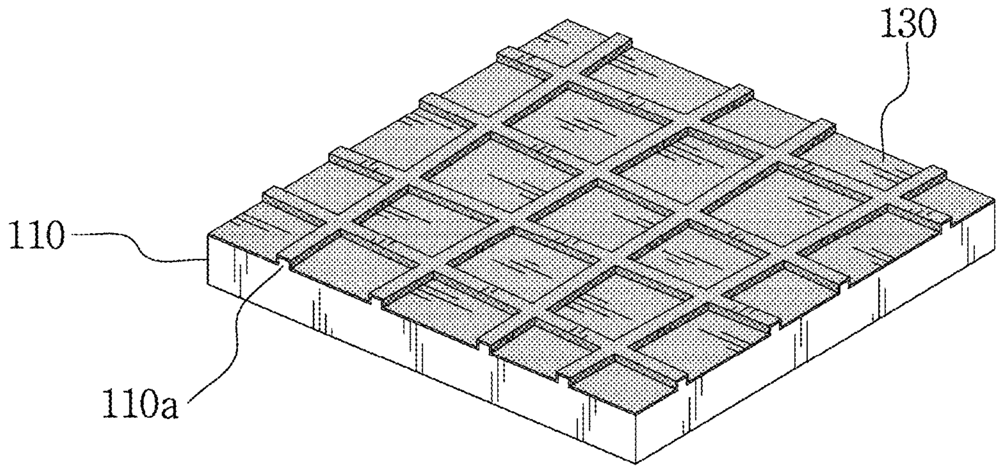
Figure 3E:
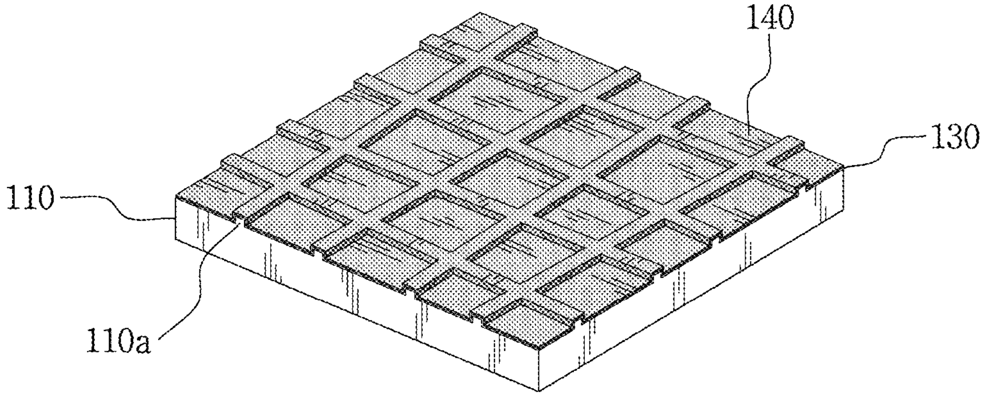

Through the process, fabrication of the mastermold having the relief-patterned region with nanowire networks 120 is ended (S102) (refer to (III) of FIG. 2 and FIG. 3C). The 'relief-patterned region with nanowire networks 120' of the mastermold is a region corresponding to a region in which the conductive nanonetworks 150*a* are replicated, as a region corresponding to the conductive nanonetworks 150*a*, and will be referred to as a 'conductive nanonetwork replicating region 110*a*' for convenience of description, hereinafter.

In the state where fabrication of the mastermold having the relief pattern-shaped 'conductive nanonetwork replicating region 110*a*' is completed, the process of coating the mastermold with the conductive material 150 is performed.

As described above, example embodiments of the present disclosure employs a method of coating the mastermold with the conductive material 150 and replicating the conductive material onto an application target substrate 10 to form the conductive nanonetworks 150*a*. Hence, in order to smoothly replicate the conductive material 150, the conductive material 150 has to be easily attached and detached from the mastermold during replication of the conductive material 150. In this respect, before the mastermold is coated with the conductive material 150, the mastermold has to be hydrophobic.

In order for hydrophobization of the mastermold, a hydrophilic thin film layer 130 having a very thin thickness is formed on a front surface of the mastermold having the 'conductive nanonetwork replicating region 110*a*' (S103). Next, a hydrophobic surface treatment layer 140 is formed on the hydrophilic thin film layer 130 (S103) (refer to (IV) and (V) of FIG. 2 and FIGS. 3D and 3E). A self-assembled monolayer made of one selected from the group of octadecyltrichlorosilane (OTS) or 1H,1H,2H,2H-perfluorodecyl-trichlorosilane (FDTS) can be used as the hydrophobic surface treatment layer 140. The hydrophobic surface treatment layer 140 is coated with the conductive material 150, and the hydrophobic surface treatment layer 140 can function as an anti-adhesive such that the conductive material 150 on the hydrophobic surface treatment layer 140 can be easily detached from the hydrophobic layer.

Figure 6A:
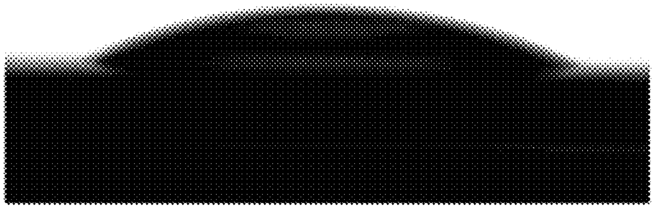
FIGS. 6A to 6C illustrate a contact angle of a silicon substrate, a contact angle obtained when FDTS is formed on the silicon substrate, and a contact angle obtained when a ZnO layer and FDTS are sequentially formed on the silicon substrate, respectively.
Figure 6B:
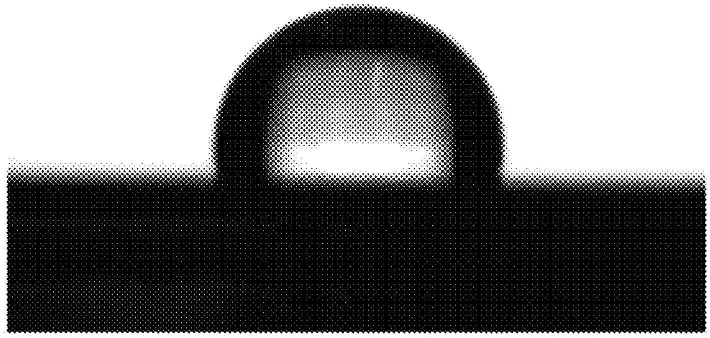
Figure 6C:
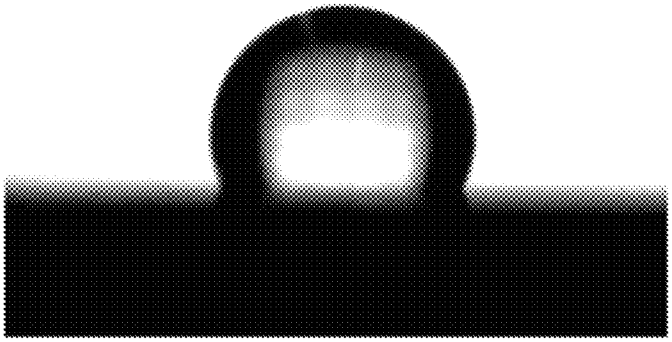

On the other hand, the hydrophilic thin film layer 130 fulfills a function of inhibiting the hydrophobic surface treatment layer 140 from being replicated together with the conductive material 150 during replication of the conductive material 150. When an amphiphilic material containing the above-described material is used as the hydrophobic surface treatment layer 140, the hydrophobic surface treatment layer has both a hydrophilic group and a hydrophobic group, and thus contact or bond between the hydrophilic group and the conductive material 150 has to be inhibited. In this respect, the hydrophilic thin film layer 130 is provided between the mastermold and the hydrophobic surface treatment layer 140 so as to induce the hydrophilic group of the hydrophobic surface treatment layer 140 to be bonded to the hydrophilic thin film layer 130. In this manner, the hydrophilic group of the hydrophobic surface treatment layer 140 and the hydrophilic thin film layer 130 are bonded together, and the hydrophobic group of the hydrophobic surface treatment layer 140 is in contact with the conductive material 150. Hence, only the conductive material 150 is replicated to the application target substrate 10 during the replication of the conductive material 150, and the hydrophobic surface treatment layer 140 is not to be replicated to the application target substrate 10. The hydrophilic thin film layer 130 can be formed by a ZnO layer but is not limited thereto. FIGS. 6A to 6C illustrate a contact angle of a silicon substrate 110, a contact angle obtained when 1H,1H,2H,2H-perfluorodecyl-trichlorosilane (FDTS) is formed on the silicon substrate 110, and a contact angle obtained when a ZnO layer and FDTS are sequentially formed on the silicon substrate 110, respectively. With reference to FIGS. 6A to 6C, the contact angle of the silicon substrate 110 is difficult to measure, the silicon substrate 110 and FDTS are formed at a contact angle of 98 degrees, and the silicon substrate 110, ZnO, and FDTS are formed at a contact angle of about 113 degrees. This means that hydrophobization of a surface of the mastermold is more improved when the hydrophilic thin film layer 130 (ZnO) and the hydrophobic surface treatment layer 140 are applied together.

Figure 3F:
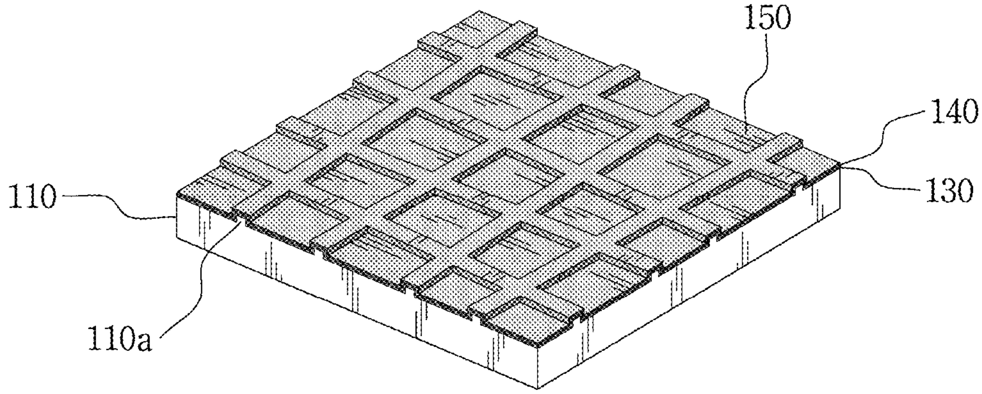

In a state where the hydrophilic thin film layer 130 and the hydrophobic surface treatment layer 140 are sequentially formed on the mastermold, the hydrophobic surface treatment layer 140 is coated with the conductive material 150 (S104) (refer to (VI) of FIG. 2 and FIG. 3F). The entire region of the mastermold including the relief pattern-shaped 'conductive nanonetwork replicating region 110*a*' are coated with the conductive material 150. Examples of the conductive material 150 can include conductive metal such as Ag, Au, Al, Cu, or Ga, a carbon-based conductive material such as graphene or CNT, conductive polymer, conductive nanoparticles, and the like, and a combination of these conductive materials 150.

Figure 3G:
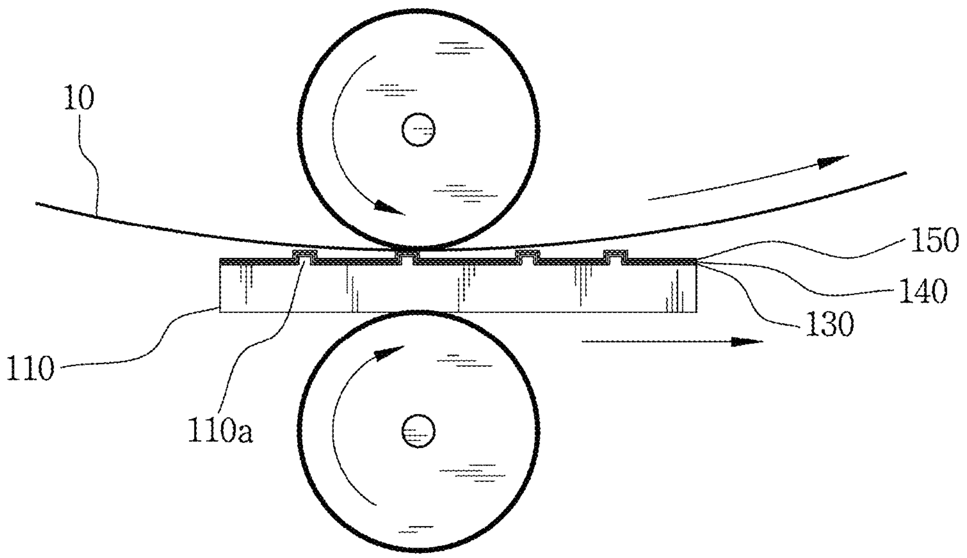
Figure 3H:
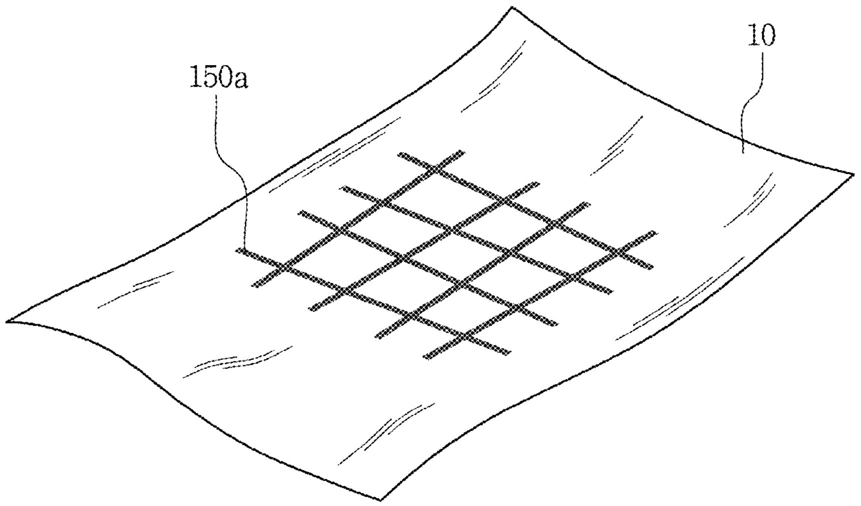

In a state where the mastermold is coated with the conductive material 150, the application target substrate 10 is prepared, and the mastermold coated with the conductive material 150 is stamped on the application target substrate 10 such that the conductive nanonetworks 150*a* are replicated onto the application target substrate 10 (S105) (refer to (VII) and (VIII) of FIG. 2 and FIGS. 3G and 3H). In this case, since the conductive nanonetwork replicating region 110*a* of the mastermold is patterned in relief, only the conductive material 150 coated on the conductive nanonetwork replicating region 110*a* of the mastermold is replicated to the application target substrate 10 during the replication of the conductive material 150, and the conductive material 150 replicated to the application target substrate 10 forms the conductive nanonetworks 150*a*. Here, since the conductive nanonetwork replicating region 110*a* corresponds to a region with nanowire networks 120, the conductive material 150, that is, the conductive nanonetworks 150*a*, replicated onto the application target substrate 10 has a shape corresponding to that of the nanowire networks 120. In addition, the application target substrate 10 corresponds to a substrate 110 of an element to which the conductive nanofilm is applied, and a flexible polymer substrate 110 or an elastic substrate 110 having elasticity can be used as the application target substrate.

On the other hand, stamping of the mastermold coated with the conductive material 150 on the application target substrate 10 and replicating the conductive nanonetworks 150*a* onto the application target substrate 10 can be performed through various methods. Examples of the methods can include a method of causing the mastermold and the application target substrate 10 to be in press contact with each other between two rollers such that the conductive nanonetworks 150*a* are replicated or a method of stamping the mastermold on the application target substrate 10 as engravings are printed.

When the conductive nanonetworks 150*a* are completely formed through replication, the conductive material 150 remains as a coating material on the mastermold except for the conductive nanonetwork replicating region 110*a* of the mastermold, and the remaining conductive material 150 can be collected and reused.

The conductive nanonetworks 150*a* can be formed on the application target substrate 10 by sequentially performing the process of fabricating the mastermold, the process of coating the mastermold with the conductive material 150, and the process of replicating conductive nanonetworks 150*a* onto the application target substrate 10.

As described above, the conductive nanonetworks are formed through a method of forming the conductive nanonetwork replicating region patterned in relief on the mastermold, coating the conductive nanonetwork replicating region patterned in relief with the conductive material, and then replicating the conductive material onto the application target substrate. Hence, a property of surface roughness of the conductive nanonetworks can be improved, and the problem of the 'contact resistance between nanowires' in the related art can be fundamentally excluded such that the electrical properties and the optical properties of an element, to which the conductive nanonetworks are applied, can be improved.

Additionally, in example embodiments of the present disclosure, the electrical properties and the optical properties of the conductive nanonetworks are controllable by adjusting a geometric shape such as a diameter or a size of the nanowire networks. As described above, since the conductive nanonetwork replicating region of the mastermold corresponds to the region patterned in relief which is the region with the nanowire networks, and the conductive nanonetworks have a shape corresponding to the nanowire networks, a change in geometric shape of the nanowire networks means a change in geometric shape of the conductive nanonetworks. Since the change in geometric shape of the conductive nanonetworks is directly associated with the electrical properties and the optical properties, the electrical properties and the optical properties of the conductive nanonetworks can be controlled by adjusting the geometric shape such as a diameter or a size of the nanowire networks.

The geometric shape of the nanowire networks is changed by adjusting a material or an electrospinning process condition of the nanowire networks. As described above, examples of materials of the nanowire networks include poly(methyl methacrylate) (PMMA), poly(N-vinylpyrrolidone) (PVP), and the like A diameter, a size, and a structure of the nanowire networks are changed depending on a type of material or a mixing ratio of materials of the nanowire networks. In addition, the diameter, the size, and the structure of the nanowire networks are changed depending on a diameter of a needle, through which spinning of a solution is performed during electrospinning of nanowire networks, or a voltage applied to the needle. For reference, an electrospinning device is configured to include a needle through which spinning of a solution is performed and a high-voltage generator that applies a voltage to the needle. Further, an alignment direction of the nanowire networks can also be controlled through disposition of electrodes of the electrospinning device.

In this manner, since the geometric shape of the nanowire networks corresponds to a geometric shape of the conductive nanonetworks, the electrical properties and the optical properties of the conductive nanonetworks can be controlled by inducing a change in geometric shape of the nanowire networks through adjustment of the material of the nanowire networks and the electrospinning process condition.

In addition to control of the electrical properties and the optical properties of the conductive nanonetworks through adjustment of the material and the electrospinning process condition of the nanowire networks, the electrical properties and the optical properties of the conductive nanonetworks can be controlled through adjustment of a thickness of the conductive material with which the conductive nanonetwork replicating region of the mastermold are coated.

The fabrication method of conductive nanonetworks using a mastermold according to the example embodiments of the present disclosure is described as above. Hereinafter, the example embodiments of the present disclosure will be more specifically described with experimental examples.

Experimental Example 1: Forming of Conductive Nanonetworks Using Mastermold

A poly(methyl methacrylate) (PMMA) solution having a concentration of 0.06 g/mL is prepared by dissolving 0.36 g of PMMA in a solution obtained by mixing N,N-dimethylformamide and acetone by a volume ratio of 2 to 1, and then electrospinning of PMMA on a silicon substrate is performed. As electrospinning conditions, a syringe tip is set to 23G, a voltage is set to 9.8 kV, a distance between a substrate and a needle is set to 16 cm, and a flow rate is set to 0.6 mL/hr.

Figure 4:
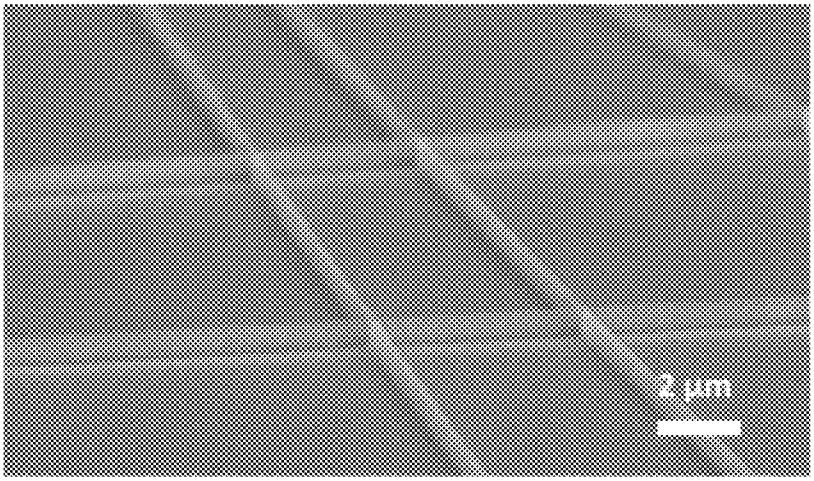
FIG. 4 is an SEM picture of a mastermold fabricated in accordance with Experimental Example 1.
Figure 7:
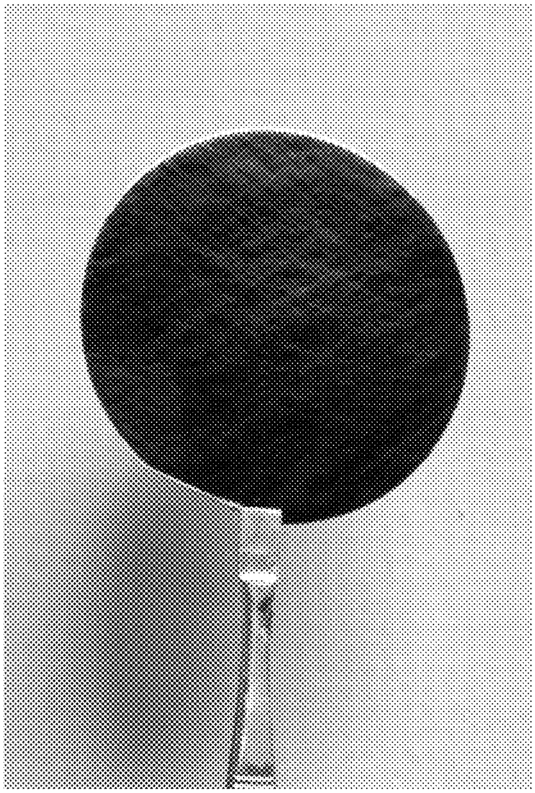
FIG. 7 illustrates a picture of a mastermold fabricated on a two-inch wafer.

Inductively coupled plasma-reactive ion etching (ICP-RIE) is performed on the silicon substrate coated with PMMA, and a region which is not coated with PMMA are etched. Next, PMMA is removed. FIG. 4 illustrates an SEM picture of a surface of the silicon substrate after the ICP-RIE and enables the silicon substrate patterned in relief to be confirmed. In addition, FIG. 7 illustrates an example in which relief patterning is performed on a 2-inch wafer.

Figure 5:
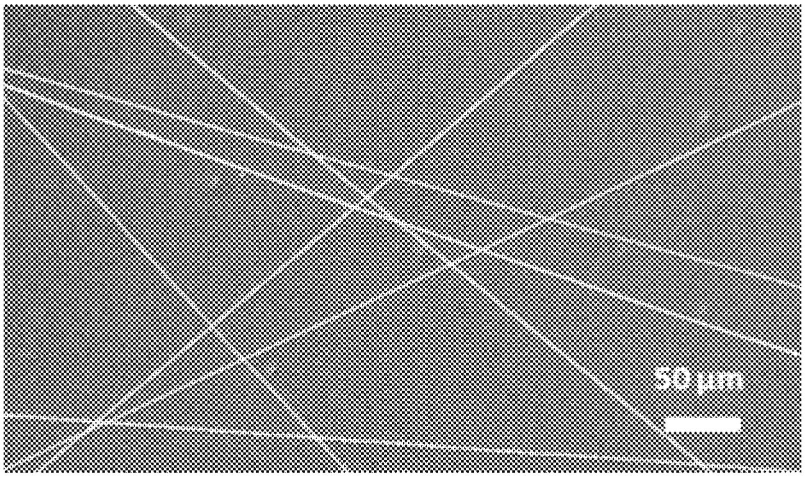
FIG. 5 is an SEM picture of conductive nanonetworks fabricated in accordance with Experimental Example 1.

After ZnO is formed on the silicon substrate patterned in relief by a sol-gel process or a sputtering process, 1H,1H,2H,2H-perfluorodecyl-trichlorosilane (FDTS) is applied on ZnO. Next, FDTS is coated with Ag at a thickness of 50 nm, 100 nm, or 200 nm. Replication of Ag on the silicon substrate onto a PET substrate is performed by using a gravure printing method. FIG. 5 illustrates an SEM picture of the PET substrate, to which Ag is replicated, and confirms Ag to be formed into a conductive nanonetwork shape.

Experimental Example 2: Optical Properties of Conductive Nanonetworks

Ag conductive nanonetworks are formed using a mastermold having a structure of silicon substrate/Zno/FDTS patterned in relief which is fabricated in accordance with Experimental Example 1, and properties of optical transmittance of the formed Ag conductive nanonetworks are compared with those of ITO.

Figure 8:
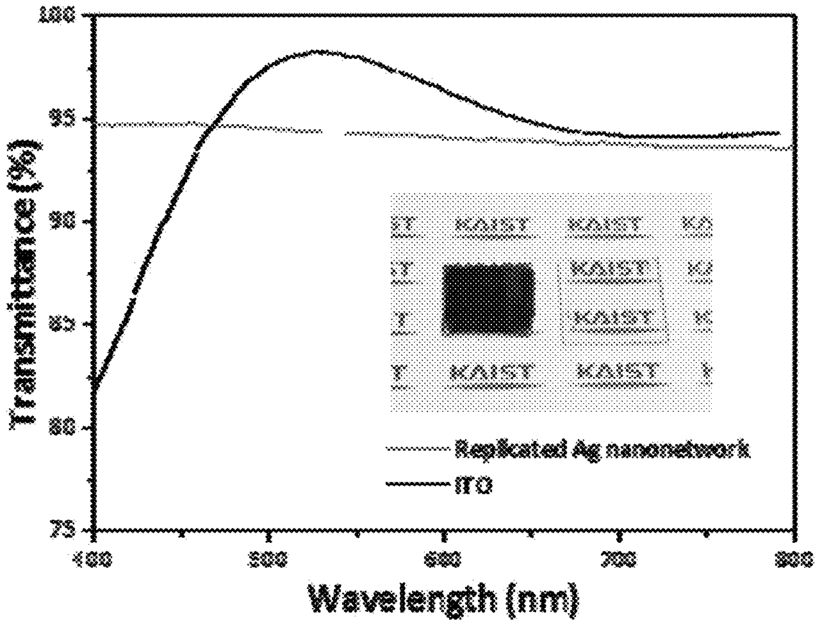
FIG. 8 is an experimental result illustrating optical transmittance depending on wavelengths, the optical transmittance being a property of Ag conductive nanonetworks fabricated in accordance with Experimental Example 1.

With reference to FIG. 8, the Ag conductive nanonetworks fabricated in accordance with Experimental Example 1 may be confirmed to have uniform optical transmittance of about 95% regardless of a wavelength within a wavelength range of 400 nm to 800 nm. On the other hand, ITO has optical transmittance of about 95% to 98% at a wavelength of about 470 nm or longer and a property of optical transmittance of 95% or lower at a wavelength of about 470 nm or shorter. As a result, the Ag conductive nanonetworks may be checked to have good optical properties nearly similar to those of ITO and also to have higher optical transmittance than that of ITO in the wavelength of about 470 nm or shorter.

In addition, properties of sheet resistance and optical transmittance depending on a thickness of the Ag conductive nanonetworks fabricated in accordance with Experimental Example 1 are checked, and the properties are compared with those of the conductive nanofilm, that is, Ag nanowires (AgNW), Cu nanothrough, graphene, and nanonetworks, fabricated in accordance with the related art. Here, AgNW is fabricated by coating a substrate with an AgNW dispersed solution through spin-coating or spray-coating, Cu nanothrough is fabricated by a method of depositing metal (Cu) on polymer nanowire networks formed through electrospinning and of replicating metal deposited nanowire networks onto a target substrate, and a graphene nanoelectrode is fabricated by a method of replicating graphene synthesized through CVD onto a substrate by using an adhesive material.

Figure 9:
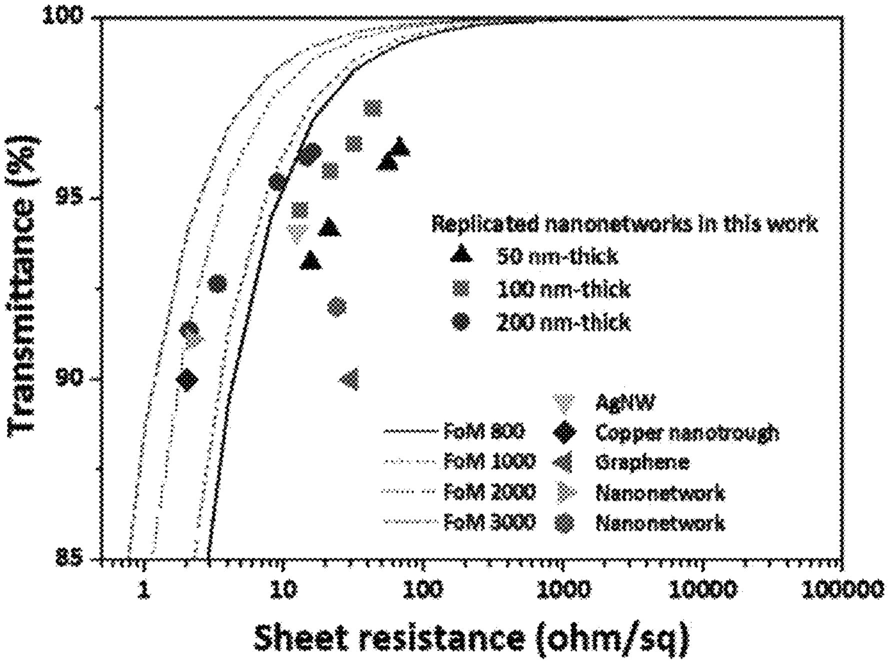
FIG. 9 is an experimental result illustrating sheet resistance and optical transmittance depending on thicknesses, the sheet resistance and optical transmittance being properties of Ag conductive nanonetworks fabricated in accordance with Experimental Example 1.

With reference to FIG. 9, as the thickness of the Ag conductive nanonetworks increases from 50 nm to 200 nm, the sheet resistance is lowered, whereas, regarding the optical transmittance, when the thickness is 100 nm, the property of the highest optical transmittance of 95% to 97% is observed. The property of optical transmittance of the Ag conductive nanonetworks is a result better than that of the conductive nanofilm, that is, Ag nanowires (AgNW), Cu nanothrough, graphene, and nanonetworks, fabricated in accordance with the related art, as illustrated in FIG. 9. Results of the sheet resistance of the Ag conductive nanonetworks may be confirmed to be better than or similar to those of the conductive nanofilm fabricated in accordance with the related art.

In addition, as a result of checking, with figure of merit (FoM) values, the properties of the optical transmittance and direct current conductance of the Ag conductive nanonetworks fabricated in accordance with the example and those of the conductive nanofilm according to the related art, the Ag conductive nanonetworks may be observed to have higher performance than that of the conductive nanofilm of the related art. For reference, FoM ($=\sigma_{DC}/\sigma_{Op}$, $\sigma_{DC}$: direct current conductivity, and $\sigma_{Op}$: optical conductivity) is, as a performance evaluating index of the nanoelectrode, an index for complex evaluation of the optical transmittance property and the direct current conductance property which are in a trade-off relationship.

Experimental Example 3: Electric Resistance Properties of Conductive Nanonetworks The electric resistance depending on time and temperature is observed, the electric resistance being properties of the Ag conductive nanonetworks fabricated in accordance with Experimental Example 1 and AgNW fabricated in accordance with the related art.

Figure 10:
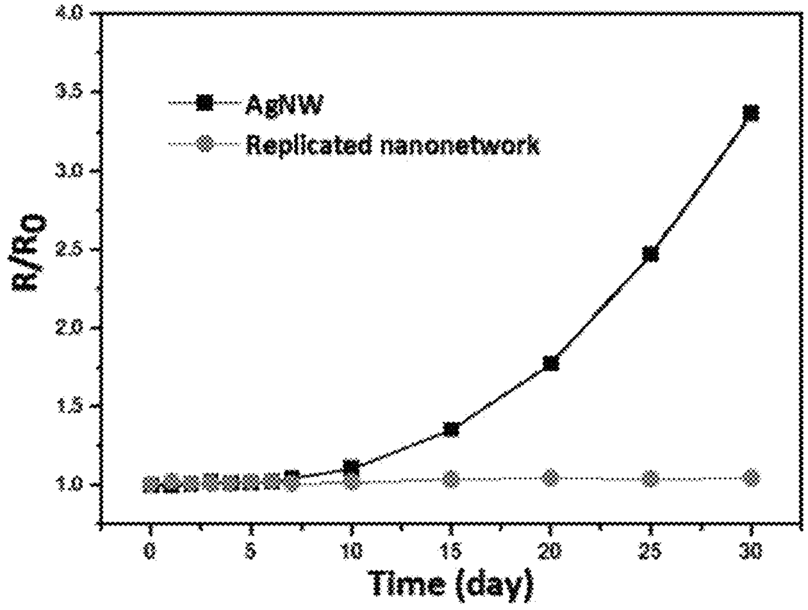
FIGS. 10 and 11 are experimental results illustrating electric resistance depending on time and temperature, the electric resistance being a property of Ag conductive nanonetworks fabricated in accordance with Experimental Example 1.

With reference to FIG. 10, the electric resistance of the Ag conductive nanonetworks changes little even when 30 days elapsed, whereas the electric resistance of AgNW rapidly increases from when about seven days elapsed.

Figure 11:
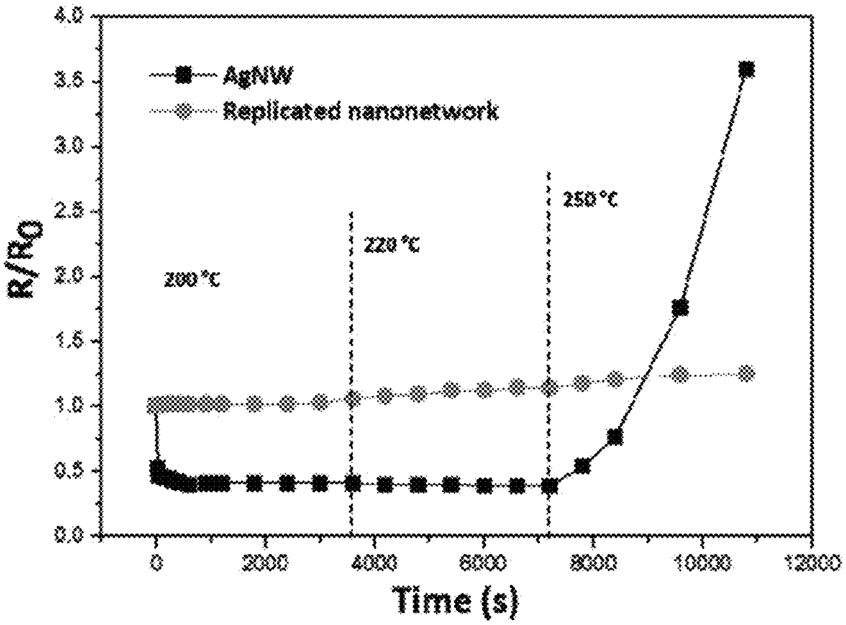

In addition, with reference to FIG. 11, the Ag conductive nanonetworks have a resistance change of 1.0 to 1.2 ($R/R_0$) as time elapses even in a temperature environment of 200° C., 220° C., and 250° C., whereas AgNW has a rapid resistance change in the temperature environment of 250° C.

The fabrication method of conductive nanonetworks using a mastermold according to the example embodiments of the present disclosure has the following effects.

According to the fabrication method, the conductive nanonetworks are formed by coating the conductive nanonetwork replicating region patterned in relief on the mastermold with the conductive material and replicating the conductive material to the application target substrate, and thus a nanonetwork-shaped conductive nanofilm may be easily fabricated and may be applied as a conductive nanofilm having a large area by increasing a size of the mastermold. Besides, the conductive nanofilm may have better electric and optical properties than a nanonetwork-shaped conductive nanofilm in the related art, and the electric and optical properties may be controlled by changing a geometric shape of the conductive nanonetworks.

While the present disclosure has been described with respect to the specific embodiments, it will be apparent to those skilled in the art that various changes and modifications may be made without departing from the spirit and scope of the invention as defined in the following claims.

What is claimed is:

1. A fabrication method of conductive nanonetworks using a mastermold, comprising:

preparing a mastermold that has a conductive nanonetwork replicating region having a relief pattern;

coating the mastermold with a conductive material; and forming conductive nanonetworks on an application target substrate by replicating the conductive material, with which the conductive nanonetwork replicating region is coated, onto the application target substrate, wherein further comprising, before the coating of the mastermold with the conductive material, sequentially, forming a hydrophilic thin film layer on the mastermold; and forming a hydrophobic surface treatment layer on the hydrophilic thin film layer, and wherein the hydrophilic thin film layer contains a hydrophilic group so as to be bonded to the hydrophobic surface treatment layer, and the hydrophobic surface treatment layer contains a hydrophobic group so as to be inhibited from being bonded to a conductive material.

2. The fabrication method of conductive nanonetworks using a mastermold according to claim 1, wherein the mastermold that has the conductive nanonetwork replicating region having a relief pattern is fabricated through a process of applying nanowire networks on a mastermold forming substrate, a process of patterning a region having the nanowire networks in relief by anisotropically etching the mastermold forming substrate on which the nanowire networks are applied, and a process of removing the nanowire networks, and wherein a region patterned in relief corresponds to the conductive nanonetwork replicating region patterned in relief of the mastermold.

3. The fabrication method of conductive nanonetworks using a mastermold according to claim 2, wherein the nanowire networks are formed through electrospinning.

4. The fabrication method of conductive nanonetworks using a mastermold according to claim 3, wherein a geometric shape of the nanowire networks corresponds to a geometric shape of the conductive nanonetworks formed on the application target substrate, and wherein electrical properties and optical properties of the conductive nanonetworks are controllable by changing the geometric shape of the conductive nanonetworks through adjustment of a geometric shape of nanowire networks which are applied.

5. The fabrication method of conductive nanonetworks using a mastermold according to claim 4, wherein the geometric shape of the nanowire networks which are to be formed on a substrate is adjustable by adjusting at least one of a diameter of a needle of an electrospinning device, a voltage applied to the needle, and a concentration of a solution containing a material which is used to form the nanowire networks.

6. The fabrication method of conductive nanonetworks using a mastermold according to claim 1, wherein the conductive material is at least one selected from a group comprising conductive metal, carbon-based conductive material, conductive polymer, and conductive nanoparticles.

* * * * *